United States Patent [19]

Watanabe

[11] Patent Number: 4,725,768

[45] Date of Patent: Feb. 16, 1988

[54] SWITCHING REGULATED POWER SUPPLY EMPLOYING AN ELONGATED METALLIC CONDUCTIVE INDUCTOR HAVING A MAGNETIC THIN FILM COATING

[75] Inventor: Shigetoshi Watanabe, Tokyo, Japan

[73] Assignee: Toko Kabushiki Kaisha, Tokyo, Japan

[21] Appl. No.: 927,449

[22] Filed: Nov. 6, 1986

[30] Foreign Application Priority Data

Nov. 12, 1985 [JP] Japan ................. 60-253441
Nov. 12, 1985 [JP] Japan ................. 60-253442

[51] Int. Cl.⁴ .................... H02M 3/155; H02M 3/158
[52] U.S. Cl. .................... 323/222; 323/351; 323/272; 363/20; 336/177
[58] Field of Search ........... 323/222, 282, 272, 351; 363/20, 21; 336/177, 222

[56] References Cited

U.S. PATENT DOCUMENTS

| | | | |
|---|---|---|---|
| 1,605,557 | 11/1926 | Osnos | 336/177 |
| 2,521,536 | 9/1950 | Reardon | 336/177 |
| 3,619,758 | 11/1971 | Deranian | 323/222 |
| 4,199,744 | 4/1980 | Aldridge et al. | 323/351 |
| 4,257,090 | 3/1981 | Kroger | 323/222 |
| 4,264,971 | 4/1981 | Courier de Mére | 363/20 |

FOREIGN PATENT DOCUMENTS

79474  5/1983  Japan .................. 363/20

Primary Examiner—William H. Beha, Jr.
Attorney, Agent, or Firm—Stevens, Davis, Miller & Mosher

[57] ABSTRACT

An inductor and a switching means are combined in such a way that the storage of the energy in the inductor and the release of the energy stored in the inductor are repeatedly carried out, whereby the released energy is rectified and smoothed to obtain a DC output. The inductor is fabricated from a conductor comprising a wire coated with a thin magnetic film in such a way that the easy axis of said thin magnetic film is extended substantially in the longitudinal direction of the wire. Furthermore, a plurality of inductor and switching element pairs are provided and are switched in different phases, respectively.

5 Claims, 10 Drawing Figures

SWITCHING REGULATED POWER SUPPLY EMPLOYING AN ELONGATED METALLIC CONDUCTIVE INDUCTOR HAVING A MAGNETIC THIN FILM COATING

BACKGROUND OF THE INVENTION

The present invention relates to a switching regulated power supply in which an inductor for the storage of energy is composed of a conductor consisting of an elongated metallic body coated with a thin magnetic film.

The inductors such as power transformers in the conventional switching regulated power supplies are in the form of a bulk-shaped ferrite core wrapped with a winding or coil and in view of the frequency characteristic of a core, the upper limit of the switching frequency is 200~300 KHz. In general, as the switching frequency is increased, the capacitance of an electrolytic or tantalum capacitor which is used to rectify and smooth the energy released from the inductor to obtain a DC output may be reduced. However, at present because of the frequency characteristics of the cores, the reduction in size of the capacitors is limited.

The demand for electronic devices to be compact in size and light in weight becomes increasingly stronger and it is now essential to make compact in size the smoothing capacitors which relatively occupy a large space in the switching regulated power supply. In addition, from the standpoint of reliability in operation, it is preferable to use ceramic capacitors rather than chemical capacitors.

SUMMARY OF THE INVENTION

In view of the above, a first object of the present invention is to provide a switching regulated power supply of the type in which an inductor or energy storage means is combined with a switching means thereby to store the energy on the inductor and the energy is released from the inductor, rectified and smoothed to obtain a DC output at a high switching frequency.

A second object of the present invention is to minimize the ripples of the current flowing from the inductor of the switching regulated power supply of the type described above without any remarkable increase in switching frequency.

To the above and other ends, the present invention provides a switching regulated power supply operable at a high switching frequency by combining a switching means with an inductor composed of a conductor in the form of a wire coated with a thin magnetic film. The conductor is made of an elongated metallic body which is, directly or through an insulating film, coated with a thin magnetic film whose easy axis is substantially aligned with the longitudinal direction of the elongated metallic body.

Furthermore, according to the present invention, a plurality of inductor and switching means pairs are provided and are switched in different phases so that the currents from the inductors are combined to obtain a DC output.

DESCRIPTION OF THE PREFERRED EMBODIMENTS

Figure 1:
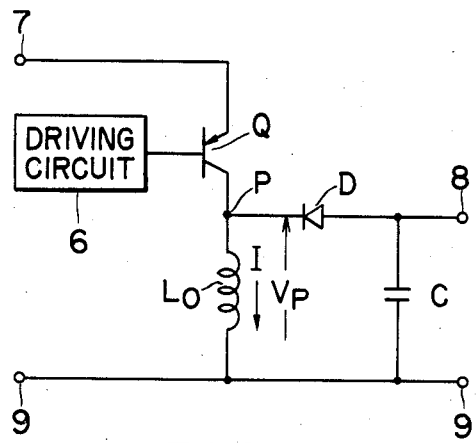
FIG. 1 is a circuit diagram of a first embodiment of a switching regulated power supply in accordance with the present invention.

Referring first to FIG. 1 illustrating a DC/DC converter, a first embodiment of the present invention will be described in detail.

An input terminal 7 and a grounded terminal 9 are interconnected with each other through a series circuit consisting of a main current path of a switching transistor Q and an inductor $L_0$ which functions as an energy storage means and the junction P between the switching transistor Q and the inductor $L_0$ are interconnected with each other through a rectifier/filter consisting of a diode D and a capacitor C. In order to turn on or off the switching transistor 1, a driving circuit 6 is provided.

In the DC/DC converter of the type described above with reference to FIG. 1, first the transistor Q is turned on to permit the exciting current from a DC source connected to the input terminal to flow to the inductor $L_0$, thereby storing the energy therein and when the transistor Q is turned off, the energy is released from the inductor $L_0$ so that a DC voltage whose value is different from the DC voltage applied to the input terminal 7 is derived from the output terminal 8.

Figure 2:
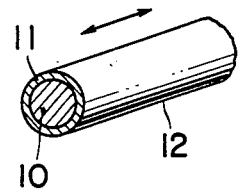
FIG. 2 is a fragmentary perspective view of a conductor illustrating its shape.

As best shown in FIG. 2, the inductor $L_0$ is in the form of a conductor 12 consisting of a core wire of, for instance, copper coated with a thin magnetic film 11 of permalloy or a Fe-Ni alloy consisting of about 20% of Fe and about 80% of Ni and wound around a non-magnetic bobbin in the form of a solenoid as a coil. The thickness of the thin magnetic film 11 is less than 10 $\mu$H and the axis of easy magnetization thereof extends substantially in the longitudinal or axial direction of the wire 10 as indicated by the double-pointed arrow in FIG. 2.

The inductor $L_0$ thus fabricated can easily attain the interior inductance of the order of from a few $\mu$H/m to 20 $\mu$H/m as will be described hereinafter. In addition, it has a high anisotropic magnetic field so that a maximum allowable current can be increased. Furthermore, in case of magnetization of the wire 10 in its circumferential direction by the current, the simultaneous spin rotation contributes to the magnetization so that the magnetization can be accomplished at a frequency which is by far higher than a frequency used in the conventional magnetization due to the displacement of magnetic walls in ferrite.

Next the efficiency $\eta$ attained when the DC/DC converter is operated at a switching frequency f of 200 MHz (the period $T_0 = 500$ nano-seconds) is described when it is desired to obtain a DC voltage of $-5$ V from the output terminal 8 when a DC voltage of $+5$ V is applied to the input terminal 7.

Figure 3:
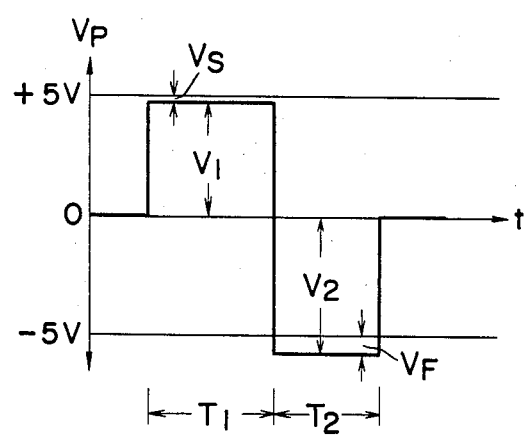
FIGS. 3 and 4 are diagrams illustrating the relations between a voltage $V_p$ and a current I.
Figure 4:
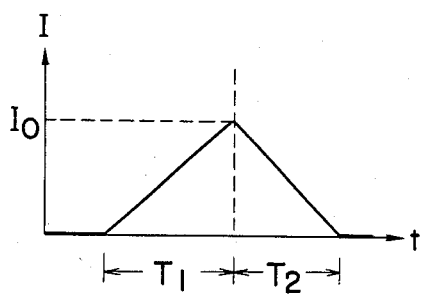

FIG. 3 shows the waveform of the voltage $V_p$ at the junction P while FIG. 4 shows the waveform of the current I flowing through the inductor $L_0$.

The value $V_1$ of the voltage $V_p$ during a time interval $T_1$ when the transistor Q is turned on and the value $V_2$ of the voltage $V_0$ during a time interval $T_2$ when the transistor Q is turned off are obtained from the following equations:

$$V_1 = 5 - V_S = 5 - 0.3 = 4.7 \text{ V} \tag{1}$$

and $$V_2 = 5 + V_F = 5 + 0.7 = 5.7 \text{ V} \tag{2}$$

where $V_S = 0.3$ V is the collector-emitter saturation voltage of the transistor Q and $V_F = 0.7$ V is a forward voltage of the diode D.

The time intervals $T_1$ and $T_2$ are obtained from the following equations, respectively:

$$T_1 = V_2 T_0/(V_1 + V_2) = 274 \text{ nanoseconds} \tag{3}$$

and $$T_2 = V_1 T_0/(V_1 + V_2) = 226 \text{ nanoseconds} \tag{4}$$

The maximum current $I_0$ flowing through the inductor $L_0$ during the time interval $T_1$ can be obtained from the following equation (5):

$$I_0 = V_1 T_1/L = 4.7 \times 2.74 \times 10^{-7}/2.5 \times 10^{-6} \tag{5}$$

$$= 0.515 A$$

where L is the value of inductance of the inductor $L_0$ and is 2.5 $\mu$H. Under these conditions, the energy E stored in the inductor $L_0$ is obtained from the following equation (6):

$$E = LI_0^2/2 = 0.398 \times 10^{-6} J \tag{6}$$

Work $W_0$ transferred to a load is given by the following equation (7):

$$W_0 = Ef = 0.398 \times 10^{-6} \times 2 \times 10^6 \tag{7}$$

$$= 0.8 W$$

Since $V_F = 0.7$ V, the loss $W_D$ through the diode D is given by the following equation (8):

$$W_D = (0.515 \times 0.7/2) \times (226/500) \tag{8}$$

$$= 0.081 W$$

Therefore, the power $W_{01}$ derived from the output terminal 8 through the diode D is given by the following equation (9):

$$W_{01} = 0.8 - 0.081 = 0.72 \text{ W} \tag{9}$$

The loss $W_{11}$ due to the collector-emitter saturation voltage $V_S$ of the transistor Q during the time interval $T_1$ is given by the following equation (10):

$$W_{11} = (0.515 \times 0.3/2) \times (274/500) \tag{10}$$

$$= 0.042 W$$

When $\beta$ is selected 20 so that the base driving current of the transistor Q becomes 515 mA and $V_S$ becomes 0.3 V; the DC/DC converter is operated with a degree of transformer coupling of 2:2; and $+5$ V is made to flow through the primary coil, the driving loss $W_{12}$ of the transistor Q during the time interval $T_1$ is given by the following equation (11):

$$W_{12} = (0.515 \times 5/20 \times 2) \times (274/500) \tag{11}$$

$$= 0.035 W$$

When the transient loss when the transistor Q is turned on or off, the loss through the inductor $L_0$ and the loss in a feedback system are simply eliminated as described above, the efficiency $\eta$ of the DC/DC converter of the type shown in FIG. 1 is given by the following equation (12):

$$\eta = 0.72 \times 100/(0.72 + 0.081 + 0.042 + 0.035) \tag{12}$$

$$= 82\%$$

The interior inductance $L_{IN}$ per meter of the conductor 12 which constitutes the inductor $L_0$ is given by the following equation (13):

$$L_{IN} = \int_o^a \mu_o r^3 dr/2\pi a^4 + \int_a^{a+\theta} \mu_o \mu_s r^3 dr/2\pi a^4 \tag{13}$$

where
- a = the radius of the wire 10;
- $\theta$ = the thickness of the thin magnetic film 11;
- $\mu_0$ = the permeability in vacuum and
- $\mu_S$ = the relative magnetic permeability when viewed from the circumferential direction; that is, from the direction of the axis of hard magnetization.

When the values of the interior inductance $L_{IN}$ obtained when the radius a which is 0.1, 0.2 and 0.4 mm is combined with the thickness $\theta$ of the thin magnetic film which is 1 $\mu$m, 2 $\mu$m and 4 $\mu$m are shown in Table 1 where $\mu_S = 2,000$.

TABLE 1

| | $\theta$ | | $L_{IN}$ ($\mu$H/m) |
|---|---|---|---|
| a | 1 $\mu$m | 2 $\mu$m | 4 $\mu$m |
| 0.1 mm | 4.05 | 8.05 | 16.05 |
| 0.2 mm | 2.05 | 4.05 | 8.05 |
| 0.4 mm | 1.05 | 2.05 | 4.05 |

The relations between the maximum allowable current flowing through the inductor $L_0$ and the radius a of the wire 10 when the coercive force Hc of the thin magnetic film 11 is 5 Oe are shown in Table 2.

TABLE 2

| The DC resistance of the wire 10 is also shown in Table 2. | | |
|---|---|---|
| a | Maximum allowable current in A | DC resistance in ohm/m |
| 0.1 mm | 0.25 | 0.55 |
| 0.2 | 0.5 | 0.14 |

TABLE 2-continued

The DC resistance of the wire 10 is also shown in Table 2.

| a | Maximum allowable current in A | DC resistance in ohm/m |
|---|---|---|
| 0.4 | 1.0 | 0.03 |

The maximum allowable current is the value of the current I at which the magnetic field H of a portion of the thin magnetic film 11 and the coercive force Hc have the same value and is given by the following equation (14):

$$H = (2I \times 10^{-3}/a) Oe \qquad (14)$$

In addition, the external inductance $L_{ex}$ of the inductor $L_0$ which is in the form of a solenoid and may be considered as an air-core solenoid coil is expressed by the following equation (15):

$$L_{ex} = K\pi^2 (N/d)^2 D^2 d \times 10^{-7} H \qquad (15)$$

where
- d = the length of the coil;
- D = the diameter of the coil;
- N = the number of turns of the coil; and
- K = Nagaoka coefficient.

The inductance L is the sum of the interior inductance $L_{IN}$ and the external inductance $L_{ex}$ which is by far lower than the interior inductance $L_{IN}$. The value of inductance thus computed substantially coincides with the actually measured value so that a desired inductance can be obtained by suitably controlling the radius of the wire 10, the thickness of the thin magnetic film 11 and the size of the coil.

Figure 5:
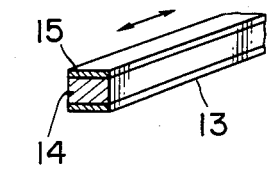
FIG. 5 is a fragmentary perspective view of a conductor having a different construction.

FIG. 5 is a fragmentary perspective view illustrating the shape of a modified conductor constituting the inductor $L_0$. While the conductor 12 shown in FIG. 2 has a circular cross sectional configuration, a conductor 13 has a rectangular cross sectional configuration and the opposing surfaces of a wire 14 having a rectangular cross sectional configuration are coated with thin magnetic films 15. When the thin magnetic film 15 is not coated over the whole surfaces of the wire 14, but is partially coated thereon in the manner described above, the inductance can be adjusted. The axis of easy magnetization of the thin magnetic film 15 extends in the longitudinal direction of the wire 14 as in the case of the inductor 12 shown in FIG. 2.

Figure 6:
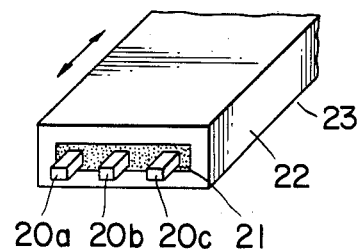
FIG. 6 is a fragmentary perspective view of a further conductor having a further different construction.

FIG. 6 is a fragmentary perspective view illustrating a further modification of an inductor used in the switching regulated power supply in accordance with the present invention.

Figure 7:
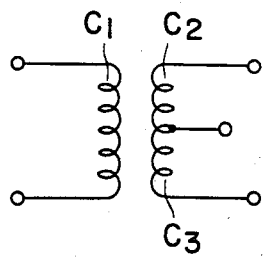
FIG. 7 shows an equivalent circuit of the conductor shown in FIG. 6.

Three wires $20_a$, $20_b$ and $20_c$ each having a rectangular cross sectional configuration are juxtaposed, spaced apart from each other by a suitable distance and embedded in an insulating body 21 of a synthetic resin so that they are electrically isolated from each other. The four surfaces of the insulating body 21 are coated with thin magnetic films 22 by an electroless plating process and the easy axis of each thin magnetic film 22 is extended in the longitudinal direction of the wire. When the thin magnetic films 22 are coated through the insulating body 21 over the wires $20_a$, $20_b$ and $20_c$ in the manner described above, it becomes possible to obtain a compound conductor 23 in which the three wires $20_a$, $20_b$ and $20_c$ which are essentially coated with the thin magnetic films 22 are disposed with a high degree of positional accuracy. The compound conductor 23 thus obtained can be wound in the form of a solenoid and be used as an inductor. The inductor composed of the compound conductor 23 has a plurality of independent interior inductance so that it becomes equivalent to a transformer. Therefore, the inductor can be used in a switching regulated power supply in which the input and output terminals must be electrically isolated from each other. FIG. 7 shows a circuit diagram of a transformer equivalently defined by the inductor shown in FIG. 6 and the center wire $20_b$ is used as the input winding $C_1$ while the outer wires $20_a$ and $20_c$ are interconnected at one ends thereof to provide the output windings $C_2$ and $C_3$, respectively.

An inductor composed of one wire can be used as a choke coil. In the first embodiment, the conductors and the compound conductor are composed of the wire or wires, respectively, but it is understood that a thin magnetic film may be formed on an insulating substrate by an electroless plating process or a vacuum evaporation process.

When a plurality of switching regulated power supplies thus fabricated are combined, a switching regulated power supply having a high degree of efficiency and has minimized ripples can be obtained.

Figure 8:
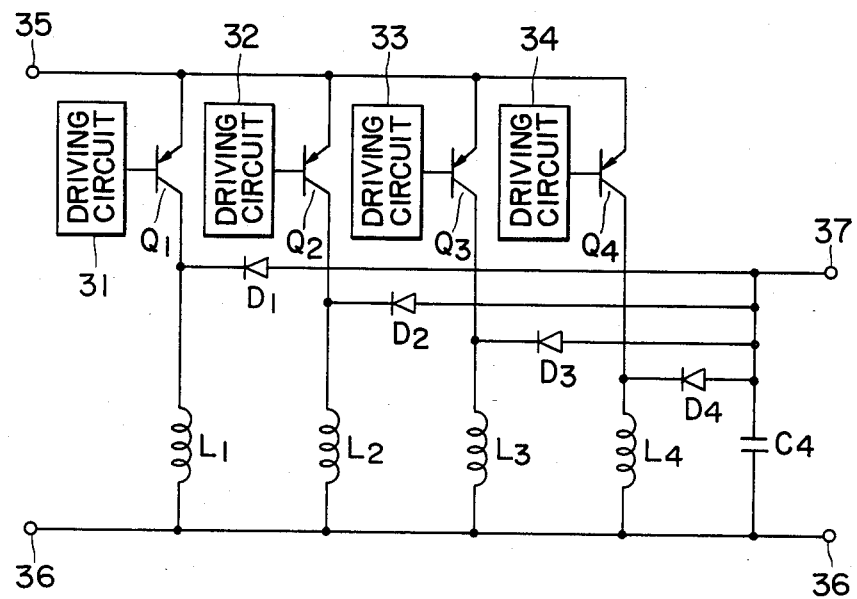
FIG. 8 is a circuit diagram of a second embodiment of a switching regulated power supply in accordance with the present invention.

FIG. 8 is a circuit diagram of an ON/OFF type DC/DC converter which is shown as a second embodiment of the present invention. An input terminal 35 is connected to the emitters of switching transistors $Q_1$, $Q_2$, $Q_3$ and $Q_4$ whose collectors in turn are connected to a grounded terminal 36 through inductors $L_1$, $L_2$, $L_3$ and $L_4$, respectively, which are substantially similar in construction to the inductor $L_0$ described above. That is, four series circuits each consisting of the main current path of each switching transistor and the inductor are connected in parallel between the input and grounded terminals 35 and 36. The junctions between the transistors Q and the inductors and an output terminal 37 are interconnected with each other through rectifying diodes $D_1$, $D_2$, $D_3$ and $D_4$, respectively, and the output terminal 37 is connected to the grounded terminal 36 through a common smoothing capacitor $C_4$. The transistors $Q_1$, $Q_2$, $Q_3$ and $Q_4$ are connected to driving circuits 31, 32, 33 and 34, respectively.

Figure 9:
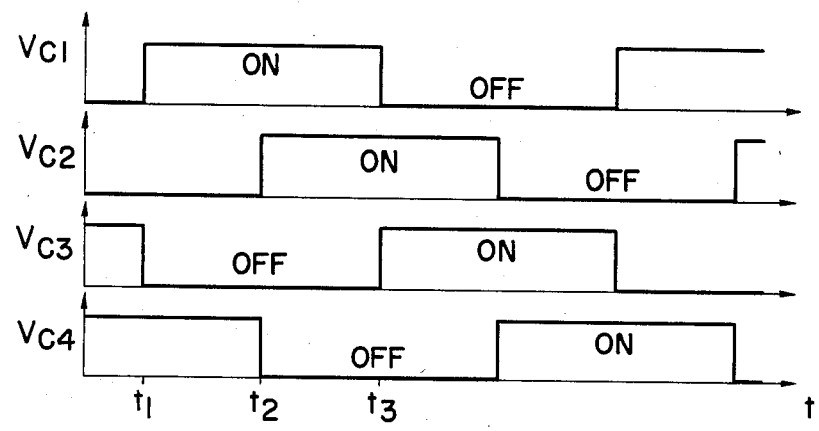
FIG. 9 shows the waveforms used to explain the mode of operation thereof.

The DC/DC converter with the above-described construction is driven by turning on and off the transistors $Q_1 \sim Q_4$ in different phases as is apparent from the waveforms of the collector voltages shown in FIG. 9.

In FIG. 9, the collector voltages $V_{c1}$, $V_{c2}$, $V_{c3}$ and $V_{c4}$ of the transistors $Q_1$, $Q_2$, $Q_3$ and $Q_4$ are plotted along the ordinate while time is plotted along the abscissa.

The transistors $Q_1$, $Q_2$, $Q_3$ and $Q_4$ are turned on and off at the same frequency or period and the adjacent transistors Q are turned on and off in such a way that their phases are different from each other by 90°. It follows therefore that two transistors are turned on in the first one quarter period. For instance, the transistors $Q_1$ and $Q_4$ are turned on during the first one quarter period from $t_1$ to $t_2$ and then the transistors $Q_1$ and $Q_2$ are turned on during the next one quarter period from $t_2$ to $t_3$.

When each transistor Q is turned on, the exciting current through the inductor connected in series to the enabled transistor, whereby the energy is stored in the inductor, but when the transistor is turned off, the stored energy is released as the power which flows through the common smoothing capacitor $C_4$. Therefore, during the first one period, the energy is released from the inductors $L_2$ and $L_3$ and during the next one period the energy is released from the inductors $L_3$ and $L_4$. The current flowing into the common smoothing capacitor $C_4$ varies at a period which is equal to one fourth period for turning on and off the transistors. That is, the current flowing through the smoothing capacitor $C_4$ varies at a frequency four times as high as the switching frequency of the transistors and is therefore similar to the current flowing into a smoothing capacitor in a DC/DC converter operating at a frequency four times as high as the frequency of the DC/DC converter shown in FIG. 8. As a result, the ripple voltage can be minimized so that the smoothing capacitor $C_4$ which has a capacitance much lower than that of the capacitor C used in the first embodiment can be used.

Figure 10:
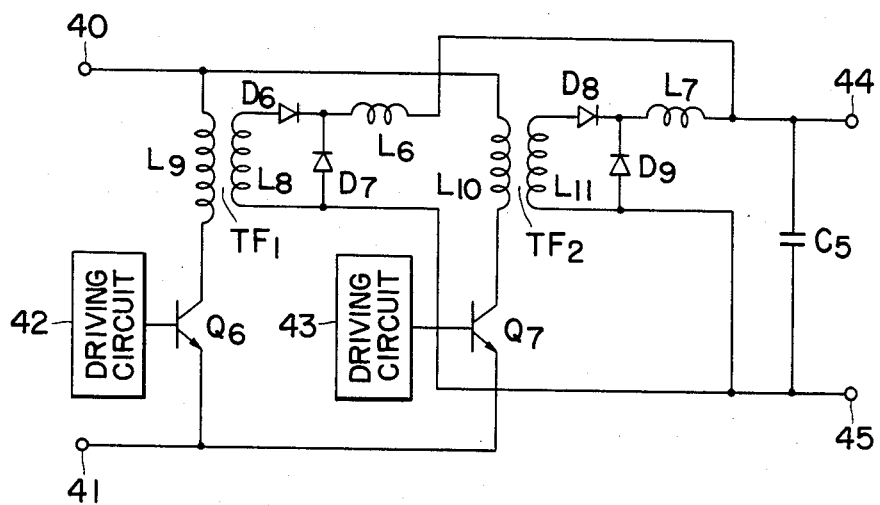
FIG. 10 is a circuit diagram of a third embodiment of a switching regulated power supply in accordance with the present invention.

FIG. 10 is a circuit diagram of an ON/ON type DC/DC converter which is shown as a third embodiment of the present invention. An input terminal 40 is connected not only to one end of a primary winding $L_9$ of a first transformer $TF_1$ but also to one end of a primary winding $L_{10}$ of a second transformer $TF_2$. The other ends of the primary windings $L_9$ and $L_{10}$ are connected to the collectors, respectively, of switching transistors $Q_6$ and $Q_7$ whose emitters in turn are connected to a grounded terminal 41. One end of a secondary winding $L_8$ of the first transformer $TF_1$ is connected through a rectifier diode $D_6$ and an inductor $L_6$ which function as a choke coil to an output terminal 44 and the other end thereof is connected not only to a grounded terminal 45 but also to the junction between the rectifier diode $D_6$ and the inductor $L_6$ through a flywheel diode $D_7$. The secondary winding 11 of the second transformer $TF_2$ is also connected to a rectifier consisting of a rectifying diode $D_8$, an inductor $L_7$ and a flywheel diode $D_9$. A smoothing capacitor $C_5$ is interconnected between the output terminal 44 and the grounded terminal 45. The transistors $Q_6$ and $Q_7$ are connected to driving circuits 42 and 43, respectively. The first and second transformers $TF_1$ and $TF_2$ serve to electrically isolate between the input and output sides.

The transistors $Q_6$ and $Q_7$ are turned on and off in such a way that their phases are different from each other by 180°. For instance, when the transistor $Q_6$ is turned on while the transistor $Q_7$ is turned off, a current flows through the rectifying diode $D_6$ and the inductor $L_6$ into the smoothing capacitor $C_5$ while the energy stored in the inductor $L_7$ is so released that a current flows through the flywheel diode $D_9$ and the smoothing capacitor $C_5$. That is, the circuit which obtains the DC output between the output and grounded terminals 44 and 45 comprises the common smoothing capacitor $C_5$ and a first switching means comprising the transistor $Q_6$, the driving circuit 42 and the first transformer $TF_1$, the inductor $L_6$ for storing the energy, a second switching means comprising the transistor $Q_7$, the driving circuit 43 and the transformer $TF_2$ and the inductor $L_7$ for the storage of energy. The value of the smoothing capacitor $C_5$ of the DC/DC converter may be determined on the assumption that the switching frequency of the transistors $Q_6$ and $Q_7$ is increased by two times.

So far the embodiments of the present invention have been described as obtaining one channel DC output, but it is of course possible to design and construct a switching regulated power supply capable of obtaining a plurality of DC output channels based on the underlying principle of the present invention.

As described above, in the switching regulated power supply in accordance with the present invention, the inductor which functions as an energy storage element is fabricated from a conductor consisting of an elongated metallic body which is, directly or through an insulator, coated with a thin magnetic film in such a way that its easy axis is extended in the longitudinal direction of the metallic body so that the high speed switching operation so far unattainable by the prior art switching regulated power supply becomes possible. As a result, the capacitance of a smoothing capacitor can be reduced so that the switching regulated power supply in accordance with the present invention can be made compact in size and light in weight. In addition, ceramic capacitors may be used as smoothing capacitors, the switching resulted power supply in accordance with the present invention becomes highly reliable in operation.

In addition, the present invention has a remarkable advantage that the mode of operation substantially equivalent to the mode of operation accomplished by increasing the switching frequency by several times can be obtained because, as described above with reference to FIGS. 8 and 10, each circuit for obtaining a DC output consists of a plurality of inductor and switching means pairs and a common smoothing capacitor used in common by all the inductor and switching means pairs. Furthermore, switching noise will not adversely affect low-frequency signals such as the video signal from or in the electronic devices so that noise can be substantially suppressed.

In the cases of the second and third embodiments described above with reference to FIGS. 8 and 10, respectively, it suffices to supply a small current to each circuit element so that the second and third embodiments are adapted to be fabricated by the integral circuit fabrication processes.

Theoretically speaking, the switching frequency can be increased almost to the spin rotational speed so that the switching frequency can be increased beyond 2 MHz.

What is claimed is:
1. In a switching regulated power supply comprising an inductor for storage of energy and a switching means having a main current path for causing said inductor to store and release energy, whereby a DC output is derived from the energy released from said inductor the improvement wherein said inductor is formed of a conductor comprising an elongated metallic body which is coated with a thin magnetic film such that an axis of easy magnetization of said thin magnetic film extends substantially in a longitudinal direction of said elongated metallic body, said inductor and said main current path of said switching means are serially connected, and said inductor is connected to a rectifying and smoothing circuit for rectifying and smoothing an output signal from said inductor.

2. A switching regulated power supply as set forth in claim 1, wherein the conductor of said inductor is a copper wire coated with permalloy.

3. A switching regulated power supply, comprising:
   a plurality of pairs of inductors and switching means, each of said switching means having a main current path and being provided to cause its associated inductor to store and release energy, each of said inductors being formed of a conductor comprising an elongated metallic body which is coated with a thin magnetic film such that an axis of easy magnetization of said thin magnetic film extends substantially in a longitudinal direction of said elongated metallic body, said plurality of switching means being provided to switch the respective inductors at different phases of a given period;

a rectifying diode; and a smoothing capacitor connected in common through said rectifying diode to said plurality of pairs of inductors and switching means to receive outputs from each of said pairs of inductors and switching means.

4. A switching regulated power supply as set forth in claim 3, wherein each of said inductors is connected in series to the main current path of its associated switching means.

5. A switching regulated power supply as set forth in claim 3, wherein each of said switching means comprises a driving circuit, a switching transistor and a transformer, and each of said inductors is used as a choke coil which is connected between said rectifying diode and said smoothing capacitor.

* * * * *